United States Patent
Warren et al.

(10) Patent No.: US 8,608,133 B2
(45) Date of Patent: Dec. 17, 2013

(54) COMMUNICATION INSTALLATION SUPPORT TOOL FOR TUNNELS AND SUBWAYS

(75) Inventors: Sam Warren, Mount Airy, MD (US); Allen Wonder, Abingdon, MD (US)

(73) Assignee: United States Holdings, LLC, Baltimore, MD (US)

( * ) Notice: Subject to any disclaimer, the term of this patent is extended or adjusted under 35 U.S.C. 154(b) by 663 days.

(21) Appl. No.: 12/731,674

(22) Filed: Mar. 25, 2010

(65) Prior Publication Data

US 2011/0233492 A1    Sep. 29, 2011

(51) Int. Cl.
*H02G 1/04*    (2006.01)
*H02G 1/02*    (2006.01)

(52) U.S. Cl.
USPC .................................................. 254/134.3 R

(58) Field of Classification Search
CPC .................................. H02G 1/04; H02G 1/08
USPC ................. 254/134.3 R, 134.3 CL, 134.3 FT, 254/134.3 PA, 134.3 SC
See application file for complete search history.

(56) References Cited

U.S. PATENT DOCUMENTS

| | | | |
|---|---|---|---|
| 4,213,596 A * | 7/1980 | Inoue et al. ............ | 254/134.3 R |
| 5,048,797 A * | 9/1991 | Theurer et al. .......... | 254/134.3 R |
| 5,826,860 A * | 10/1998 | Theurer et al. .......... | 254/134.3 R |
| 6,007,050 A * | 12/1999 | Theurer et al. .......... | 254/134.3 R |
| 6,193,215 B1 * | 2/2001 | Glemet ................. | 254/134.3 PA |
| 6,896,243 B2 * | 5/2005 | Theurer et al. .......... | 254/134.3 R |
| 7,950,628 B2 * | 5/2011 | Warren et al. ................. | 254/122 |
| 2002/0100898 A1 * | 8/2002 | Knoerzer et al. ....... | 254/134.3 R |
| 2003/0201431 A1 * | 10/2003 | Theurer et al. .......... | 254/134.3 R |
| 2009/0078921 A1 * | 3/2009 | Plummer ............... | 254/134.3 FT |
| 2010/0084621 A1 * | 4/2010 | Raineri ................. | 254/134.3 R |
| 2010/0123111 A1 * | 5/2010 | Warren et al. ................. | 254/2 C |
| 2010/0198559 A1 * | 8/2010 | Warren ......................... | 702/188 |

* cited by examiner

*Primary Examiner* — Joseph J Hail
*Assistant Examiner* — Marc Carlson
(74) *Attorney, Agent, or Firm* — Laubscher & Laubscher, P.C.

(57) ABSTRACT

Apparatus for installing communication and power cables in tunnels includes a base member adapted for longitudinal transport through a tunnel on a railroad flatbed that rotatably supports a cable supply reel. A cable guide arm is connected at one end with the base member for pivotal displacement about a horizontal pivot axis parallel with the base member longitudinal axis, and a cable guide pulley is connected with the other end of the guide arm for guiding a cable supplied by the reel to a desired point of installation on the tunnel wall. A length-adjusting arrangement adjusts the length of the guide arm to correspond with the width of the tunnel, and an angle-adjusting arrangement adjusts the angle of the guide arm relative to the horizontal surface of the base member. The base member is mounted on a sled for lateral displacement transversely of the flatbed.

12 Claims, 4 Drawing Sheets

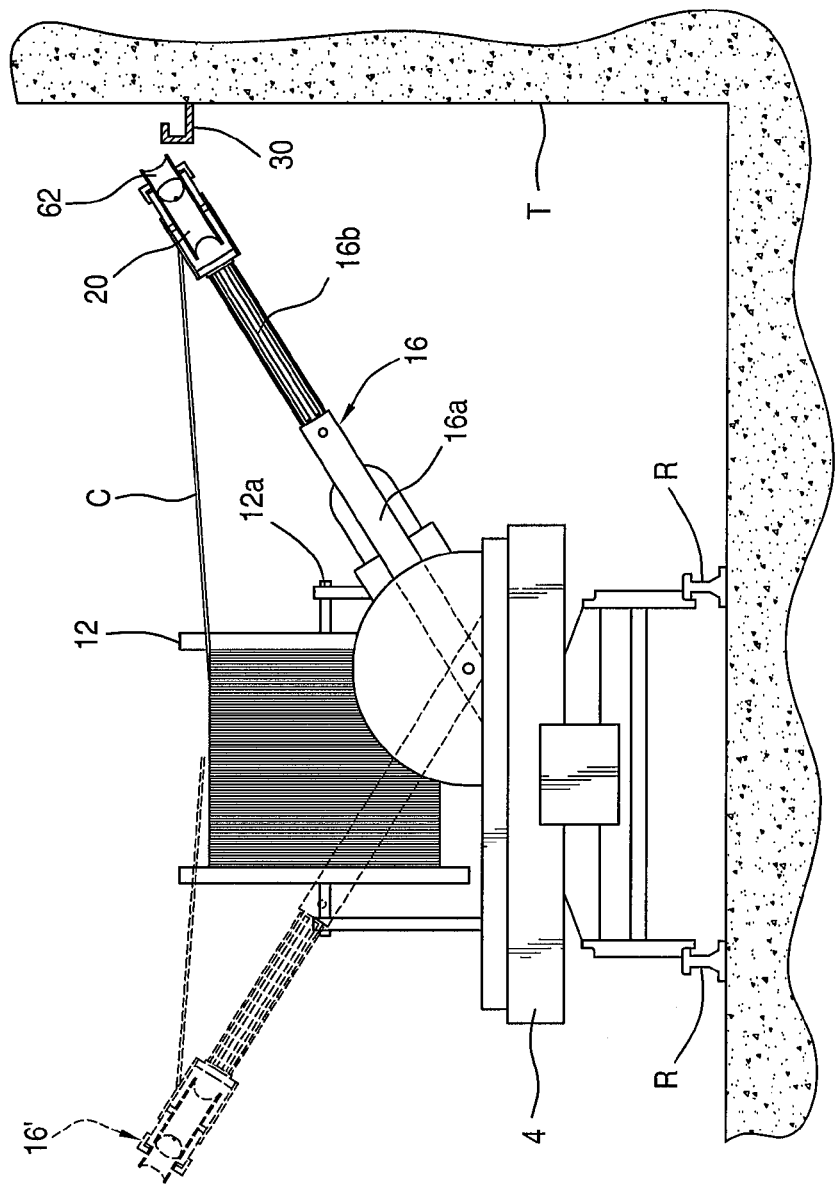
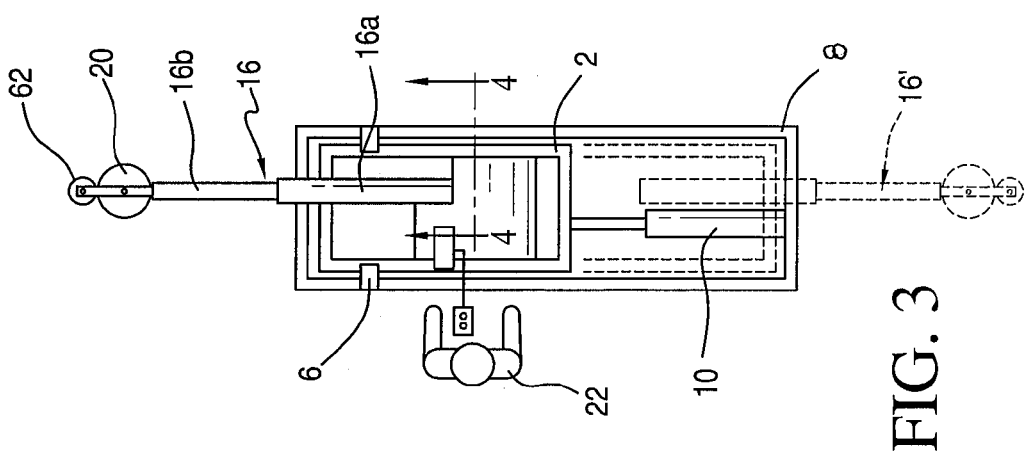

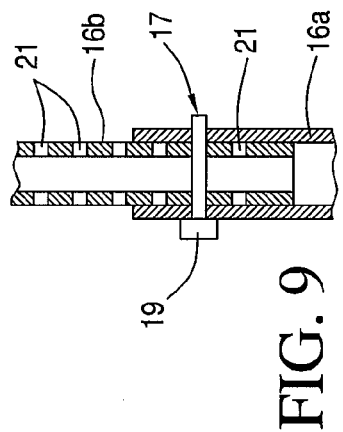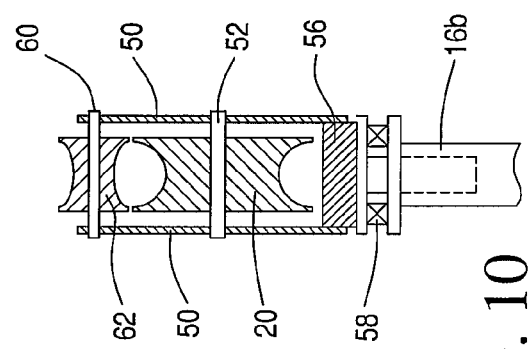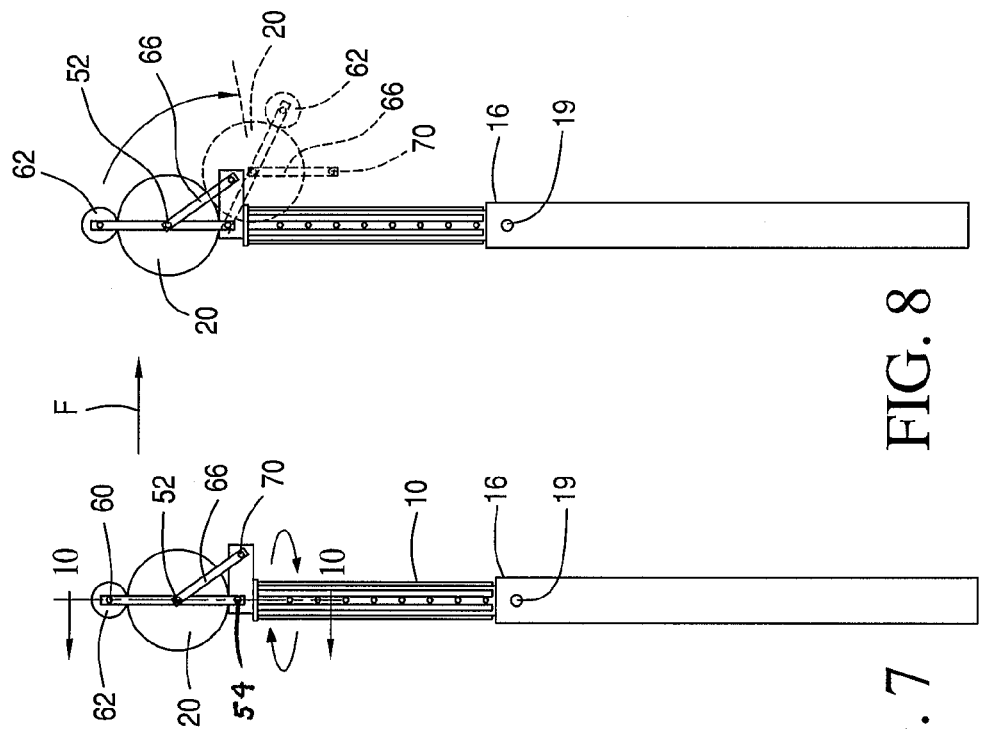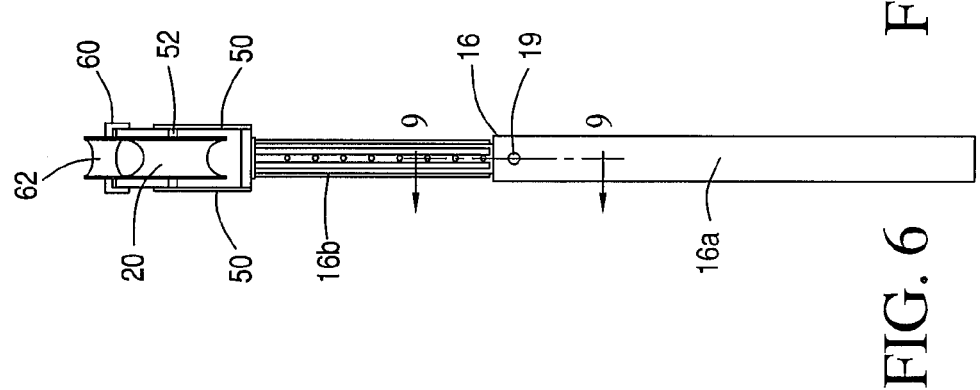

COMMUNICATION INSTALLATION SUPPORT TOOL FOR TUNNELS AND SUBWAYS

BACKGROUND OF THE INVENTION

1. Field of the Invention

The present invention relates generally to installation support tooling for cabling and other communications systems and equipment in subways and tunnels.

2. Brief Description of the Prior Art

Work on installation of cabling and other communications networks in tunnels and subways typically requires workers to access portions of the tunnels and subways that are out of their immediate reach. Furthermore, the installation of communications equipment and systems in such tunnels involves working with long, unsupported lengths of cabling and other communications systems. In addition, in order to work safely around rail lines having an electrified third rail in such tunnels and subways, workers normally must shut off the electricity being supplied to such third rail. This can be inconvenient and time consuming, because the manual labor and human resources required to perform such installation operations are cumbersome and excessive.

SUMMARY OF THE INVENTION

Accordingly, a primary object of the present invention is to provide apparatus for installing communication and power cables in tunnels, including a base member adapted for longitudinal transport through a tunnel on a railroad flatbed that rotatably supports a cable supply reel. A cable guide arm is connected at one end with the base member for pivotal displacement about a horizontal pivot axis parallel with the base member longitudinal axis, and a cable guide pulley is connected with the other end of the guide arm for guiding a cable supplied by the reel to a desired point of installation on the tunnel wall. A length-adjusting arrangement adjusts the length of the guide arm to correspond with the width of the tunnel, and an angle-adjusting arrangement adjusts the angle of the guide arm relative to the horizontal surface of the base member. The base member is mounted on a sled for lateral displacement transversely of the flatbed.

According to a more specific object of the invention, the installation support tool includes an adjustable arm, a base, a positioning structure and a control system. The adjustable arm is extendable from a minimum to maximum length to allow installation in various sizes of tunnels and subways. A positioning structure is attached to the base and the adjustable arm and allows for the adjustable arm to be rotated through and held at a range of positions up to 80 degrees relative to the vertical position in either horizontal direction. The positioning structure also includes a slider structure so that the attached end of the adjustable arm may be moved along the horizontal direction to reach either side of the tunnel or subway. The control system is connected to the positioning structure and allows control of such rotation of the adjustable arm. The base is mounted to a railcar or other movable support structure to allow movement and positioning along the axis of the tunnel or subway.

The adjustable arm includes inner and outer sleeve portions which allow for the extension of the arm for positioning of the cable and other communications networks close to the final mounting position in the tunnel and subway. The arm can be extended manually. The arm is locked in place by use of locking pins and a series of holes in the inner and outer sleeve portions of the adjustable arm. The arm may also be extended by hydraulic or electric means. The adjustable arm supports the weight of the cable and other communications networks during the installation process. The adjustable arm includes a cable control head at the free end of such arm. The cable control head is comprised of several sheaves to safely control the cable without risk of damage to the cable while the cable is feeding from a cable spool through the adjustable arm to the workers. The cable control head includes a release hinge safety feature to minimize damage to surrounding structures should the control head come into contact with another structure. The control head includes a hinge at its base and a shear pin which together allow the control head to swing up to 180 degrees away from a point of impact.

The positioning structure allows for the adjustable arm to be rotated through and held at a range of positions up to 80 degrees relative to the vertical position in either horizontal direction. The adjustable arm is fixed onto the positioning structure and is rotated via a gearbox mechanism. The positioning structure is mounted on a sled mounted on casters so that the attached end of the adjustable arm may travel horizontally between two tracks on a base frame to reach either side of the tunnel or subway. The tracks encapsulate the casters to prohibit any derailment or detachment of the positioning arm from the track base frame. The tracks include a series of holes to allow locking pins to be placed to prevent movement of the positioning structure once located in the desired position.

The control system is connected to the positioning structure and allows control of such rotation of the adjustable arm. The control system includes a control panel display and a series of light sensors located on the positioning structure and the adjustable arm. The light sensors act as a stopping mechanism to prohibit the adjustable arm from rotating beyond its maximum limit of rotation by eliminating power to the electric drive once the beams are broken. The light sensors are infrared to prohibit the safety device from inadvertently being activated by another light source or obstacle.

The base is mounted on a railcar or other movable support structure to allow movement and positioning along the axis of the tunnel or subway. Cable spools may be mounted on the same rail car or other movable structure behind the base. Workers will typically be performing installation operations ahead of the cable installation apparatus.

BRIEF DESCRIPTION OF THE FIGURES

Other objects and advantages of the invention will become apparent from a study of the following specification when viewed in the light of the accompanying drawing, in which:

FIG. 2 is a sectional view taken along line 2-2 of FIG. 1;

FIG. 3 is a detailed top plan view of the base member and sled arrangement of FIG. 1;

FIG. 6 is a side elevation view of the adjustable-length cable guide arm with the guide pulley in a given initial position;

FIG. 7 is a corresponding view of FIG. 6 with the guide pulley and the guide pulley support means rotated through an angle of 90°;

FIG. 8 illustrates the apparatus of FIG. 7 following the application of a breakaway force to the drive pulley support means;

FIG. 9 is a sectional view taken along line 9-9 of FIG. 6;

FIG. 10 is a sectional view taken along line 10-10 of FIG. 7;

DETAILED DESCRIPTION

Figure 1:
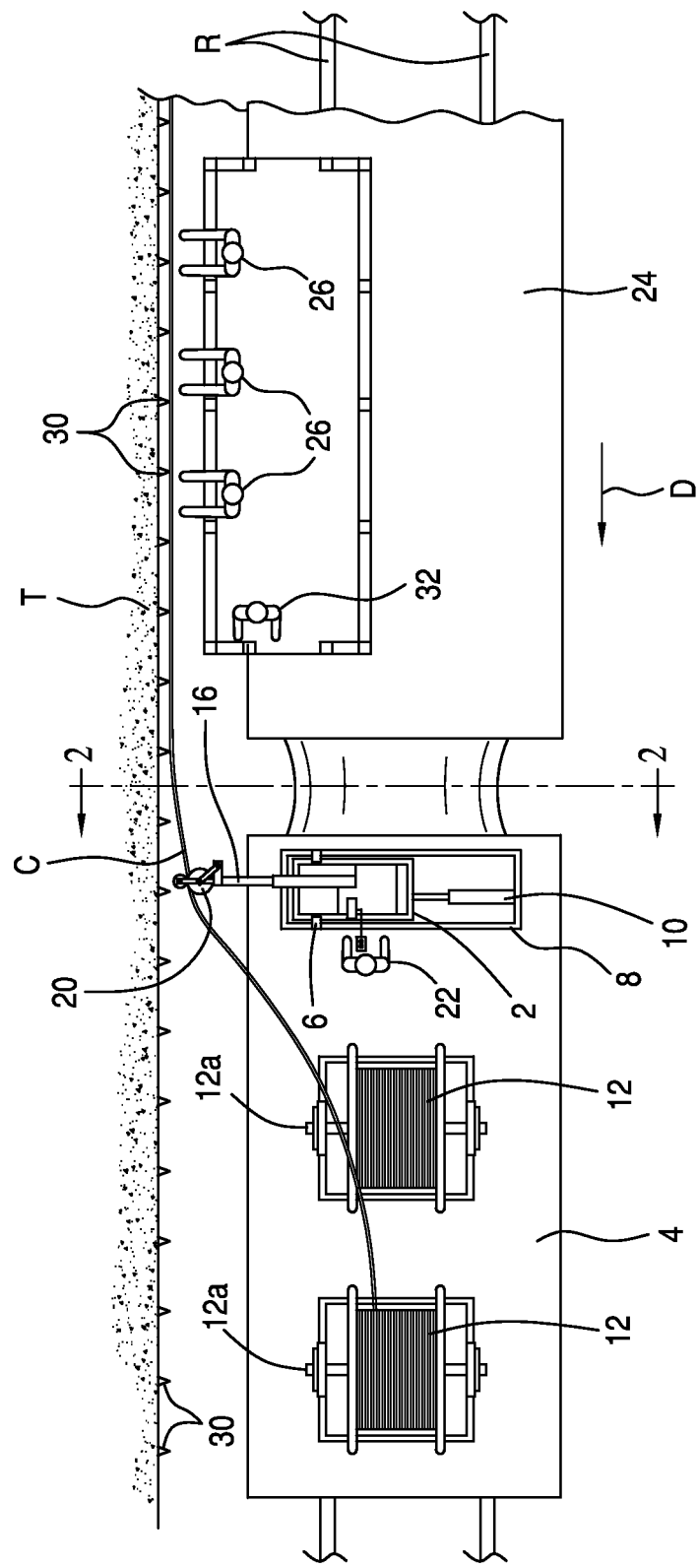
FIG. 1 is a top plan view of the cable installing apparatus of the present invention.

Referring first more particularly to FIGS. 1-3, the cable installing apparatus of the present invention includes a base member 2 that is supported by a first flatbed unit 4 of railway rolling stock for travel longitudinally through a tunnel T along a pair of fixed support rails R in the direction indicated by the arrow D. The base member 2 comprises a sled that is supported by slide elements 6 on a fixed rectangular frame 8 for lateral displacement transversely of the flatbed unit, as controlled by first piston and cylinder hydraulic motor means 10. Rotatably mounted on the horizontal upper surface of the flatbed unit adjacent the base member 2 are a plurality of cable supply reels 12. In the illustrated embodiment, the cable supply reels rotate about parallel horizontal axes 12a that extend normal to the direction of travel D of the flatbed unit 4. The cables C are flexible communication cables, power cables, or the like.

An adjustable-length cable guide arm 16 is pivotally connected at one end with the base member 2 for pivotal displacement about a pivot shaft 18 (FIG. 4) having an axis that extends longitudinally of the flatbed 4 unit. The cable guide arm comprises a plurality of tubular telescopically-arranged sections 16a and 16b. At its other end, the guide arm is provided with a guide pulley 20 that serves to guide a length of cable C supplied by one of the supply reels 12 toward the inner surface of the tunnel wall T, as controlled by the cable supply operator 22. As will be described in greater detail below, the cable guide arm is pivoted under the control of the operator 22 about the pivot shaft 18 between the positions 16 and 16' shown in FIG. 2 by the solid and phantom lines, respectively. Carried by a second flatbed rolling stock unit 24 are one or more installers 26 who manually attach the cable C to a plurality of longitudinally-spaced wall-mounted fixed cable supports 30. A safety officer 32 supervises the entire cable installation process.

Figure 4:
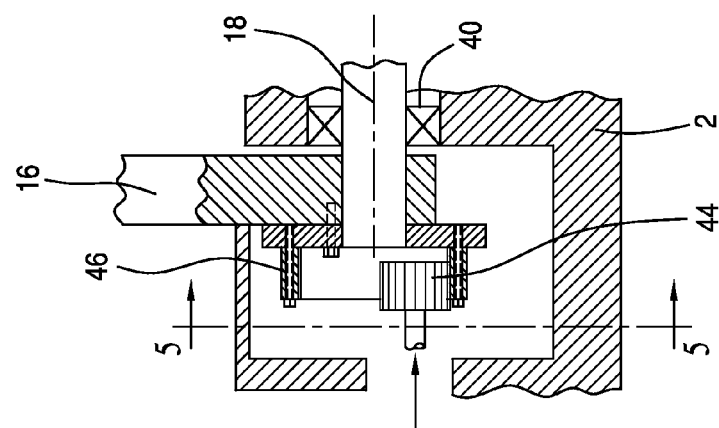
FIG. 4 is a sectional view taken along line 4-4 of FIG. 3.
Figure 5:
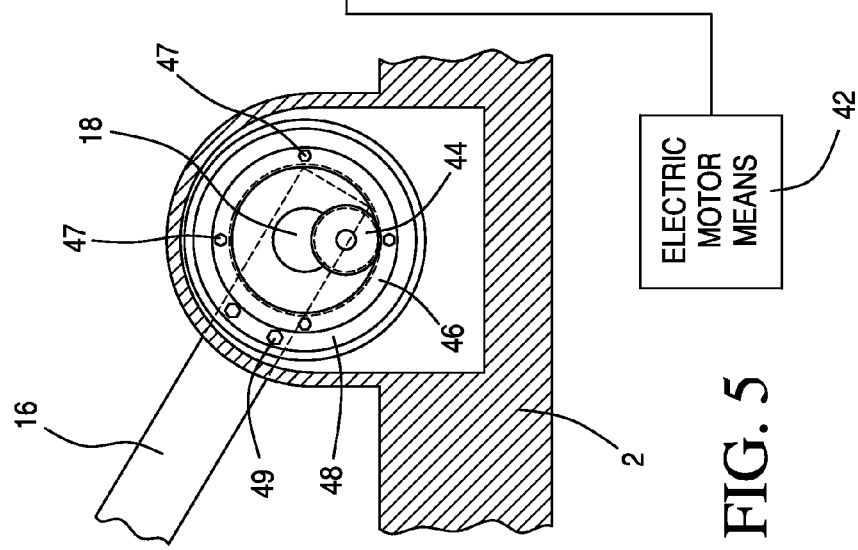
FIG. 5 is a sectional view taken along line 5-5 of FIG. 4.

Referring to FIGS. 4 and 5, the guide arm pivot shaft is rotatably supported by bearing means 40 fixed on the base member 2. The guide arm is secured to the pivot shaft 18 and is pivoted between selected angular positions relative to the base member 2 by drive means including an electric motor 42 controlled by operator 22, drive pinion 44, and a ring gear 46 that is bolted by bolts 47 to support plate 48, which support plate in turn is bolted by bolts 49 to the cable guide arm 16.

As shown in FIGS. 6 and 9, the effective length of the guide arm 16 may be adjusted by length adjusting means 17, which in the illustrated embodiment comprises a locking pin 19 that is axially displaceable from an unlocked position toward the illustrated locked position extending through aligned openings contained in the outer tubular section 16a, and selected pairs of longitudinally spaced openings 21 contained in the inner tubular section.

Referring to FIGS. 6-8, the cable pulley 20 is rotatably supported between a pair of parallel spaced support arms 50 for rotation about axis 52. The lower ends of these support arms are pivotally connected by pivot pins 54 with a support plate 56 that is connected for rotation relative to the upper extremity of the guide arm section 16b by swivel bearing means 58 (FIG. 10). Rotatably supported between the upper extremities of the support arms for rotation about an axis 60 parallel to rotation axis 50 is a retaining pulley 62 which is arranged to retain the cable on the cable guide pulley 20. The support arms 50 are normally maintained in longitudinal alignment with the guide arm 16 by bracing arms 66 that are pivotally connected at their upper ends with the pivot shaft 52, the lower ends of the bracing arms being connected with the support plate 56 by breakaway frangible connecting pins 70. Consequently, in the event that the cable guide pulley is subjected to the application of an undesired impact force F (FIG. 8), the frangible connection 70 is fractured, and the bracing arms 66 are released, whereupon the pulley support pivots to the retracted inoperable position shown in phantom in FIG. 8.

Figure 12:
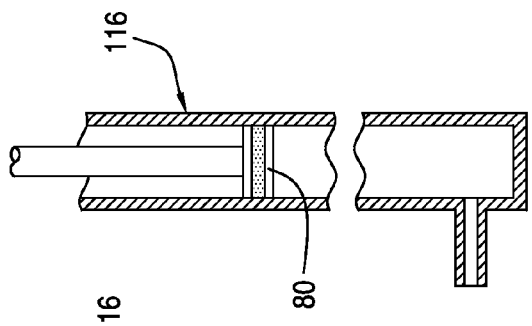
FIG. 12 is a sectional view taken along line 12-12 of FIG. 11.
Figure 11:
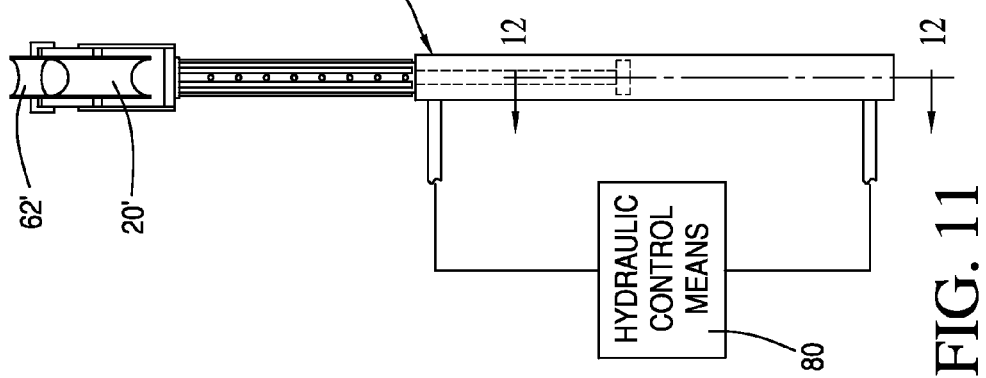
FIG. 11 is a side elevation view of a modification of the guide arm arrangement of FIG. 6.

Referring now to FIGS. 11 and 12, if desired, the length of the cable guide arm 116 may be controlled by a piston and cylinder hydraulic motor 80 under the control of the operator 22.

While the preferred forms and embodiments of the invention have been illustrated and described, it will be apparent to those skilled in the art that various changes and modifications may be made without deviating from the inventive concepts set forth above.

What is claimed is:

1. Cable installing apparatus for mounting a flexible cable on the wall of a tunnel, comprising:
    (a) a flatbed having a generally horizontal upper surface and a generally horizontal longitudinal axis, said flatbed being adapted for longitudinal transport through the tunnel;
    (b) a cable supply reel mounted on said flatbed for rotation about a given axis;
    (c) cable guide means mounted on said flatbed for guiding cable supplied by the reel toward a mounting position adjacent the inner surface of the tunnel wall, said cable guide means comprising:
        (1) a base member
        (2) an adjustable-length guide arm connected at one end with said base member for pivotal displacement about a horizontal, pivot axis parallel with the base member axis;
        (3) a cable guide element connected with the other end of said guide arm;
        (4) length adjusting means for adjusting the guide arm to a given length corresponding with the width of the tunnel; and
        (5) angle-adjusting means for adjusting the angle of said guide arm relative to said base member, said angle adjusting means including:
            (a) gear means connected between said guide arm and said base member for angularly pivoting said guide arm relative to said base member; and
            (b) reversible electric motor means connected with said base member for operating said gear means to place said guide arm at a given angle relative to said base member.

2. Cable installing apparatus as defined in claim 1, wherein said gear means includes a drive pinion connected with said electric motor means, and a ring gear connected with said guide arm.

3. Cable installing apparatus for mounting a flexible cable on the wall of a tunnel, comprising:
    (a) a flatbed having a generally horizontal upper surface and a generally horizontal longitudinal axis, said flatbed being adapted for longitudinal transport through the tunnel;
    (b) a cable supply reel mounted on said flatbed for rotation about a given axis;

(c) sled means connecting a base member with said flatbed for lateral travel transversely with respect to said flatbed;

(d) cable guide means mounted on said base member for guiding cable supplied by the reel toward a mounting position adjacent the inner surface of the tunnel wall, said cable guide means comprising:
  (1) an adjustable-length guide arm connected at one end with said base member for pivotal displacement about a horizontal, pivot axis parallel with the base member axis;
  (2) a cable guide element;
  (3) length adjusting means for adjusting the guide arm to a given length corresponding with the width of the tunnel; and
  (4) angle-adjusting means for adjusting the angle of said guide arm relative to said base member.

4. Cable installing apparatus as defined in claim 3, wherein said guide arm comprises a plurality of tubular telescopically-arranged longitudinally-displaceable sections.

5. Cable installing apparatus as defined in claim 4, wherein said cable guide means further includes locking means for locking together said sections.

6. Cable installing apparatus as defined in claim 5, wherein said locking means comprises:
  (a) a plurality of longitudinally spaced locking openings contained in a first one of said sections; and
  (b) a locking pin carried by a second one of said guide arm sections for axial displacement from an unlocked position toward a locked position in engagement with one of said locking openings.

7. Cable installing apparatus as defined in claim 4, and further including hydraulic motor means for axially displacing said sections to produce a given guide arm length.

8. Cable installing apparatus as defined in claim 4, wherein said cable guide element comprises:
  (a) a cable guide pulley; and
  (b) pulley support means supporting said cable guide pulley for rotation about an axis normal to the guide arm longitudinal axis.

9. Cable installing apparatus as defined in claim 8, wherein said cable guide means further includes swivel means supporting said pulley support means for rotation about the guide arm longitudinal axis.

10. Cable installing apparatus as defined in claim 9, and further including a retaining pulley connected with said pulley support means for rotation about an axis parallel with the cable guide pulley axis, said retaining pulley being arranged to retain the cable on said cable guide pulley.

11. Cable installing apparatus as defined in claim 10, and further including fracturable breakaway means connecting said guide pulley support means with said guide arm for pivotal displacement between a normal operable position and an inoperable position relative to said cable guide arm, whereby upon application of a lateral impact force to said cable guide pulley, said breakaway means is fractured to permit pivotal displacement of said guide pulley support means to said inoperable position.

12. Cable installing apparatus as defined in claim 3, and further including hydraulic motor means for displacing said sled means relatively to said flatbed unit.

\* \* \* \* \*